US012607055B2

(12) United States Patent
Vanini

(10) Patent No.: US 12,607,055 B2
(45) Date of Patent: Apr. 21, 2026

(54) HINGE FOR DOORS

(71) Applicant: NUOVA STAR S.p.A., Zola Predosa (IT)

(72) Inventor: Marco Vanini, Zola Predosa (IT)

(73) Assignee: NUOVA STAR SPA, Zola Predosa (IT)

( * ) Notice: Subject to any disclaimer, the term of this patent is extended or adjusted under 35 U.S.C. 154(b) by 167 days.

(21) Appl. No.: 18/543,871

(22) Filed: Dec. 18, 2023

(65) Prior Publication Data

US 2024/0200381 A1 Jun. 20, 2024

(30) Foreign Application Priority Data

Dec. 20, 2022 (IT) ........................ 102022000026145

(51) Int. Cl.
*E05F 1/12* (2006.01)
*E05F 3/20* (2006.01)
*E05F 5/02* (2006.01)

(52) U.S. Cl.
CPC .................. *E05F 1/12* (2013.01); *E05F 3/20* (2013.01); *E05F 5/02* (2013.01); *E05Y 2201/21* (2013.01)

(58) Field of Classification Search
CPC ....... E05F 1/12; E05F 3/20; E05F 5/02; E05F 1/1261; E05F 5/10; E05Y 2201/21; E05Y 2201/264; E05Y 2900/308
See application file for complete search history.

(56) References Cited

U.S. PATENT DOCUMENTS 7,676,888 B2 * 3/2010 Vanini ................... F24C 15/023 16/277
8,533,914 B2 * 9/2013 Vanini ....................... E05F 5/02 16/50
8,806,719 B2 * 8/2014 Kleeman ............... F24C 15/023 16/286
9,121,211 B1 * 9/2015 White ....................... E05F 5/02
9,157,262 B2 * 10/2015 Lee ........................... E05D 3/12

(Continued)

FOREIGN PATENT DOCUMENTS

CA 2735474 A1 * 3/2010 ........... G02B 6/3825
CN 116607852 A * 8/2023 ............... E05D 3/06

(Continued)

OTHER PUBLICATIONS

Italian Search Report dated Jun. 6, 2023 from counterpart Italian Patent Application No. 102022000026145.

*Primary Examiner* — Jason W San
*Assistant Examiner* — Matthew J Sullivan
(74) *Attorney, Agent, or Firm* — SHUTTLEWORTH & INGERSOLL, PLC; Timothy J. Klima

(57) ABSTRACT

Described is a hinge for doors of electrical household appliances, including a first lever and a box-shaped element pivoted to each other and movable relative to each other in a tiltable fashion, fixable one to a frame and the other to a door of an electrical household appliance, to make the door movable relative to the frame between a closed position and an open position, a first elastic element connected to the first lever and designed to generate, with a relative deformation, an elastic reaction force designed to compensate at least partially the weight force of the door during the opening or closing of the door, a damping member housed inside a containment cartridge.

14 Claims, 4 Drawing Sheets

(56) References Cited

U.S. PATENT DOCUMENTS

| | | | | |
|---|---|---|---|---|
| 9,181,741 | B2 * | 11/2015 | Bettinzoli | E05F 1/1261 |
| 9,316,036 | B2 * | 4/2016 | Collene | E05F 5/08 |
| 9,926,734 | B2 * | 3/2018 | Dora | E05F 1/1261 |
| 9,995,075 | B2 * | 6/2018 | Vanini | E05F 1/1246 |
| 10,082,298 | B2 * | 9/2018 | White | E05F 3/20 |
| 10,794,102 | B2 * | 10/2020 | Vanini | E05F 1/12 |
| 10,890,334 | B2 * | 1/2021 | White | E05F 1/1261 |
| 11,187,021 | B2 * | 11/2021 | Gherardi | E05F 1/1261 |
| 11,268,313 | B2 * | 3/2022 | Terenzi | E05F 3/10 |
| 11,702,878 | B2 * | 7/2023 | Terenzi | E05F 1/1276 16/286 |
| 12,071,804 | B2 * | 8/2024 | Plesnik | E05F 5/02 |
| 2011/0146654 | A1 * | 6/2011 | Basavalingappa Mudbasal | E05F 3/20 16/222 |
| 2024/0117663 | A1 * | 4/2024 | Lee | E05F 1/1253 |
| 2025/0123005 | A1 * | 4/2025 | Collene | F24C 15/023 |

FOREIGN PATENT DOCUMENTS

| | | | | |
|---|---|---|---|---|
| EP | 3073038 | A1 | 9/2016 | |
| EP | 2718526 | A1 | 1/2021 | |
| WO | WO-2013133774 | A1 * | 9/2013 | F24C 15/023 |
| WO | WO-2021165166 | A1 * | 8/2021 | E05F 1/1253 |

* cited by examiner

HINGE FOR DOORS

This application claims priority to Italian Patent Application 102022000026145 filed Dec. 20, 2022, the entirety of which is incorporated by reference herein.

This invention relates to a hinge for doors of electrical household appliances.

More specifically, this invention relates to a hinge for doors of domestic appliances equipped with a damping member.

Still more specifically, the invention relates to a modular hinge for doors of domestic appliances equipped with a damping member.

The invention refers purely by way of a non-limiting example to a front-opening household appliance such as, for example, an oven.

In the ovens of known type, the hinges used normally comprise a box-shaped structure connected by a kinematic mechanism to a lever, with the lever and the box-shaped structure designed to open mutually in a tilting fashion.

The box-shaped structure and the lever are designed so as to be connected one to a door and the other to a frame of the oven.

More in detail, one between the box-shaped structure and the lever is fixed to the frame of the oven at a side of the access opening of the latter, whilst the other is fixed to an edge of the door, which in this way is made movable in a tilting fashion relative to the above-mentioned frame.

Elastic elements act on the above-mentioned lever which influence the movement of the door during both opening and closing.

When the oven door is rotated away from its closed position, the above-mentioned elastic elements oppose, firstly, the detachment of the door from the supporting frame of the oven and, secondly, the subsequent rotational movement of the door and its consequent lowering to the end of stroke position, in which the access opening of the oven is fully open. During the second step of the opening movement, the door, under the combined action of its weight, which favours the descent, and of the elastic elements, which exert a braking action, performs a gradual rotation.

During the rotation of the door from its open limit position, the action of the above-mentioned elastic elements is firstly balanced by the weight of the door, thus ensuring, initially, a gradual closing rotation.

Both in the open and closed condition in the absence of a suitable braking action by the user, the door can be left, if necessary, but knowingly unbalanced before the end of stroke of maximum opening and in any case pushed by the elastic elements towards the frame of the oven during the closing of the door.

In the first case (opening) there is generally an unpleasant oscillation whilst in the second case (closing) the force produced by the above-mentioned elastic elements is such as to cause a closing which is often quite sudden and noisy.

Consequently, that is to say, for applying a braking action, suitable damping members have been introduced in the hinges.

The use of internal dampers in hinges in order to slow the closing or opening of the door is well known in the prior art.

The introduction of these damping members in the hinges for electric household appliances is not free of drawbacks.

One of these drawbacks is the difficulty of inserting damping members in the limited space available for housing the hinges which are actually effective and long-lasting.

More specifically, in order to make the hinges equipped with damping members as compact as possible, the damper unit was inserted inside their box-shaped body, with the obvious need to extend the box-shaped body and the consequence of increasing the costs in terms of both material and moulding complexity, generally in effect, it is necessary to make a multiplicity of moulding equipment for making the box-shaped bodies which can house the absorber unit and those which, on the other hand, cannot house it.

Another drawback connected to the prior art hinges equipped with internal damping members regards the substantial impossibility of modifying the features and the methods of operation of the damper since it is inserted inside the box-shaped body and it is therefore very difficult, if not impossible, to modify the dimensions, for example in order to adapt the hinge to doors of different weights, or modify the operation, for example with the introduction of leverages or cams, since they would also need to be located inside the box-shaped body which, without doubt, has not been sized to house components which were not planned at the time of its design.

The aim of this invention is to provide a hinge for doors of electrical household appliances which is free of the above-mentioned drawbacks and is at the same time structurally simple and practical and effective to use.

Another aim of this invention is to provide a hinge for doors of electrical household appliances which is simple and inexpensive to make.

Yet another aim of this invention is to provide a hinge for doors of electrical household appliances which allows a practical adaptation to different damping needs.

According to the invention, these aims and others are achieved by a hinge for doors comprising the technical features described in the accompanying claims.

The technical features of the invention, according to the above-mentioned aims, are clearly described in the appended claims and its advantages are apparent from the detailed description which follows, with reference to the accompanying drawings which illustrate non-limiting example embodiments of it, and in which:

Figure 1:
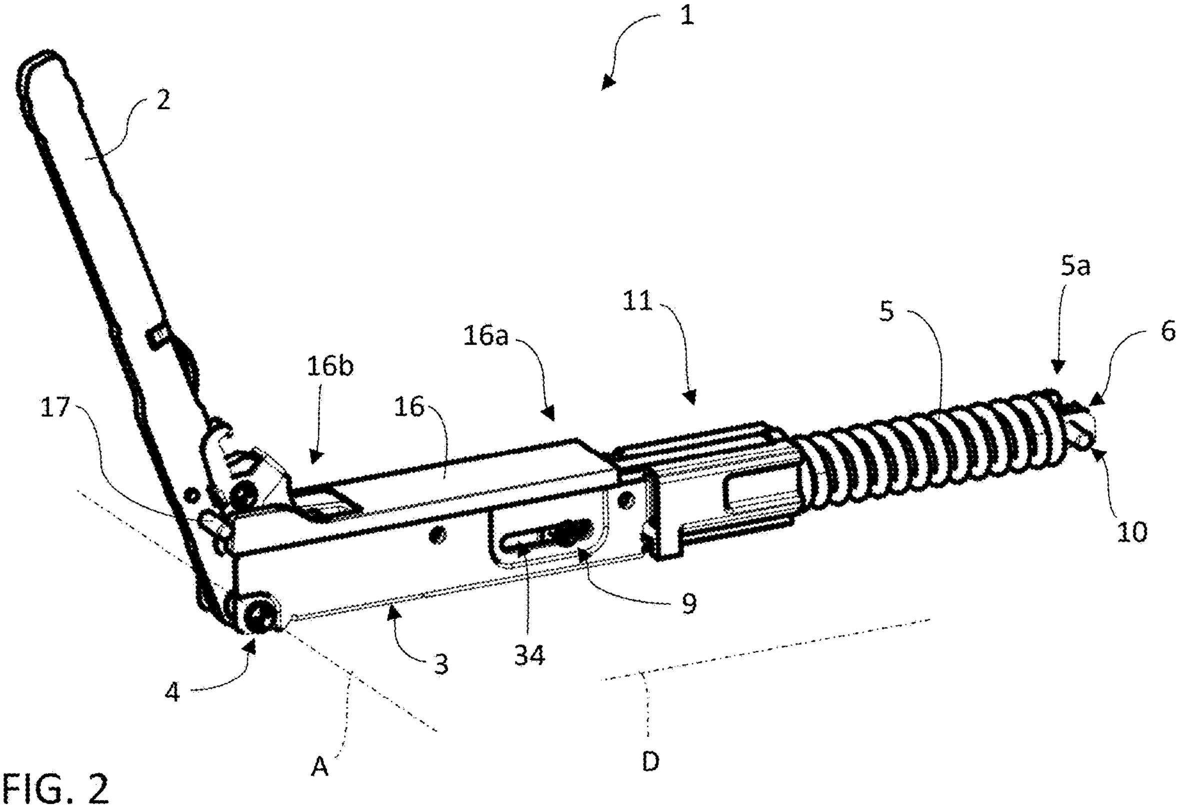
FIG. 1 is a schematic perspective view, in a partly open position, of a first embodiment of a hinge for doors of electrical household appliances according to this invention.
Figure 2:
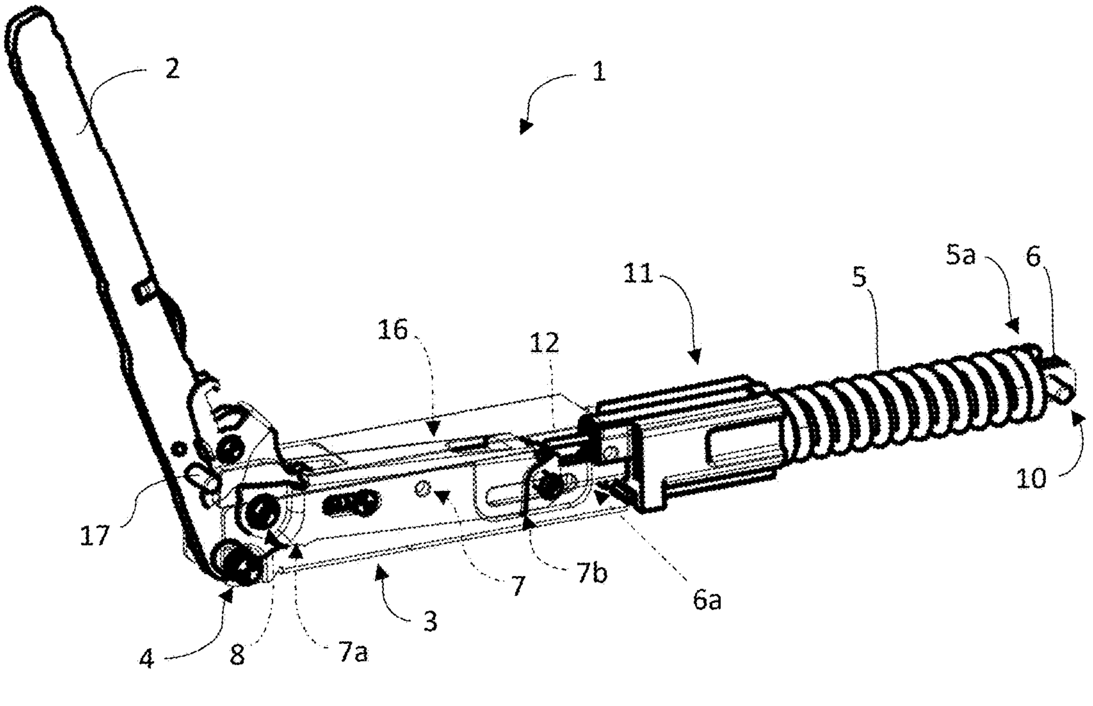
FIG. 2 shows the hinge of FIG. 1 with some parts transparent to better illustrate others.
Figure 3:
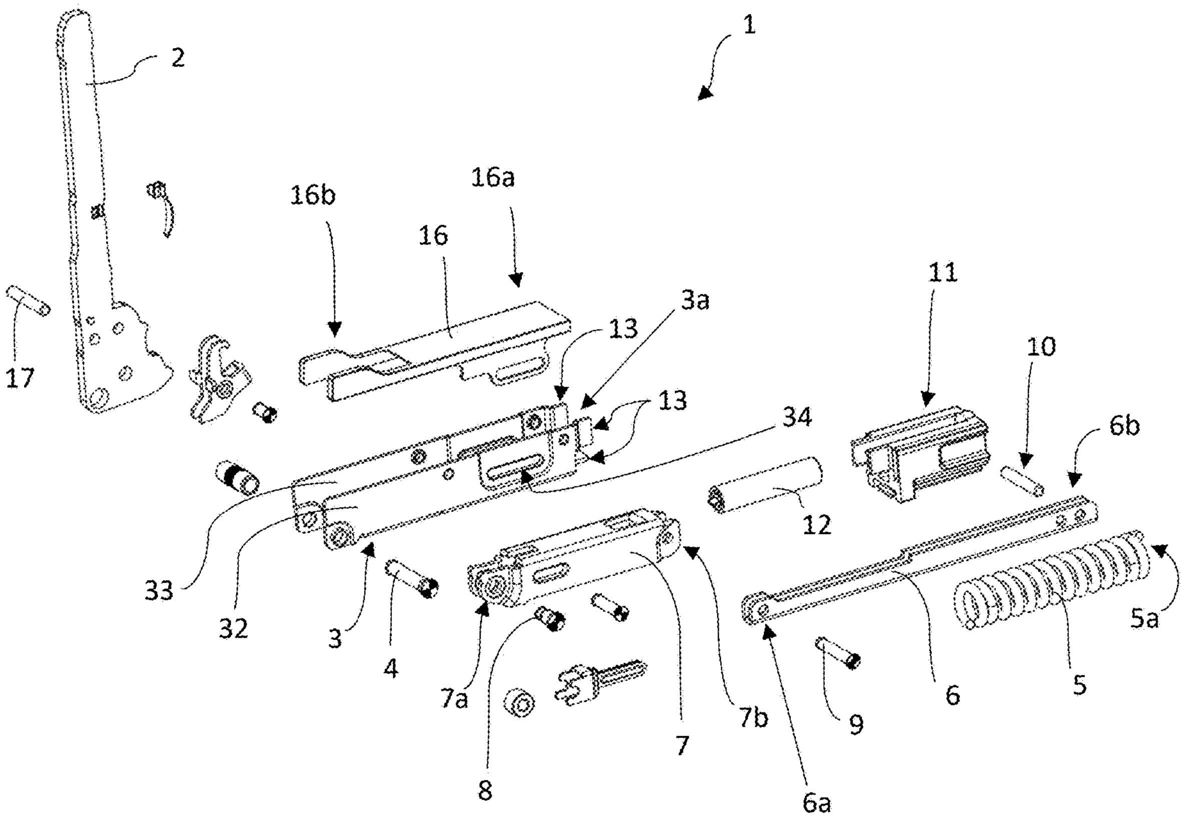
FIG. 3 is a schematic exploded configuration view of the hinge of FIGS. 1 and 2.
Figure 4:
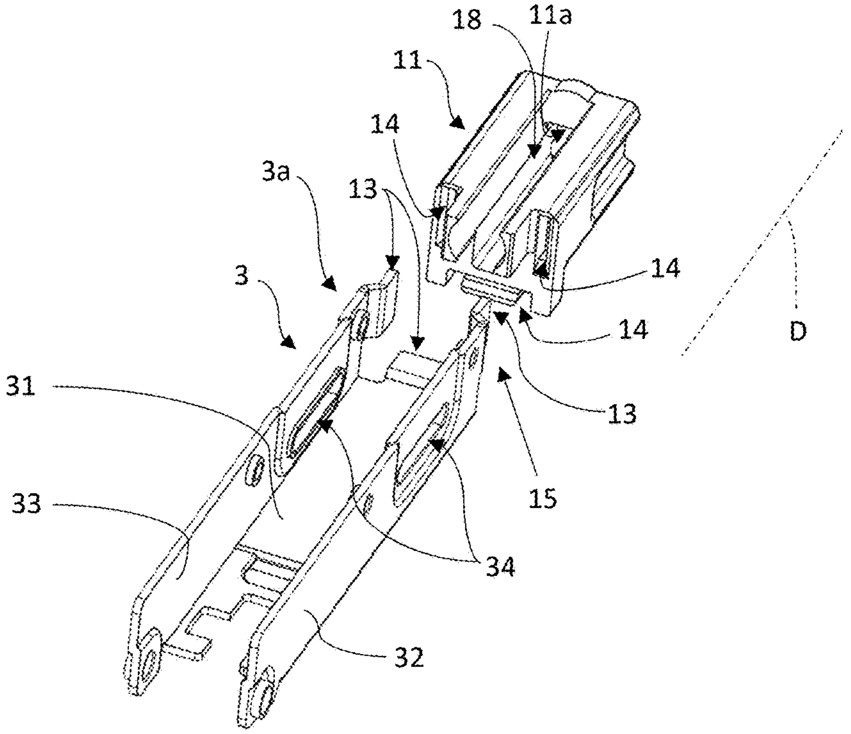
Figure 7:
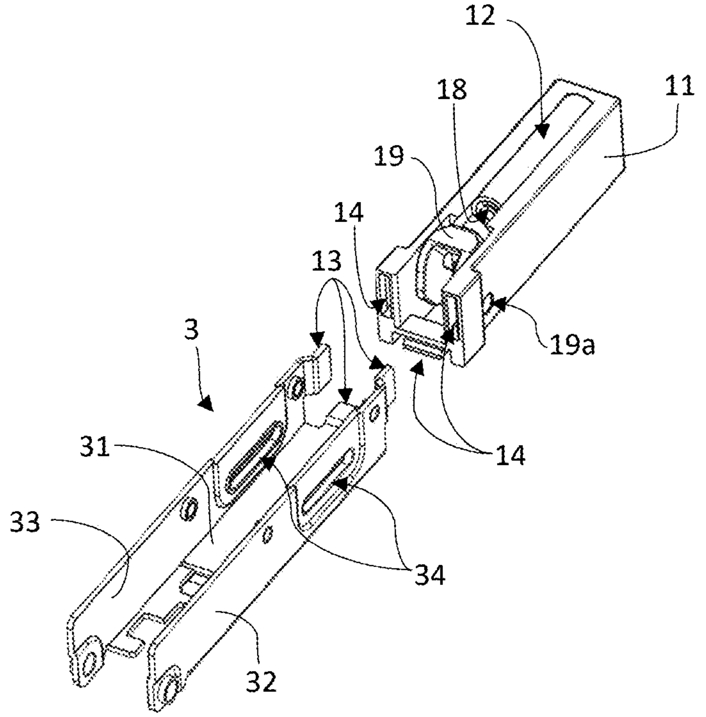
Figure 3A:
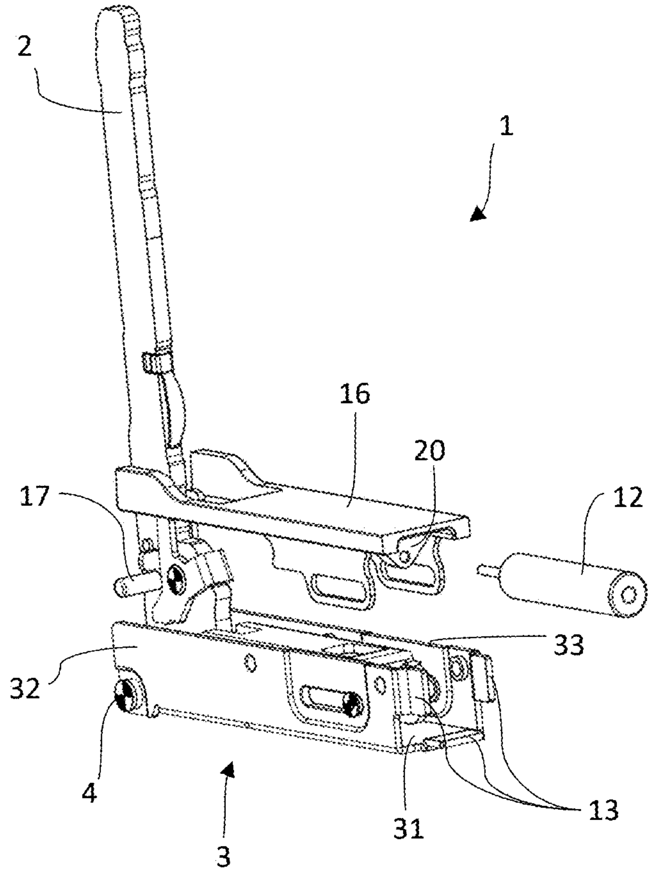
Figure 5:
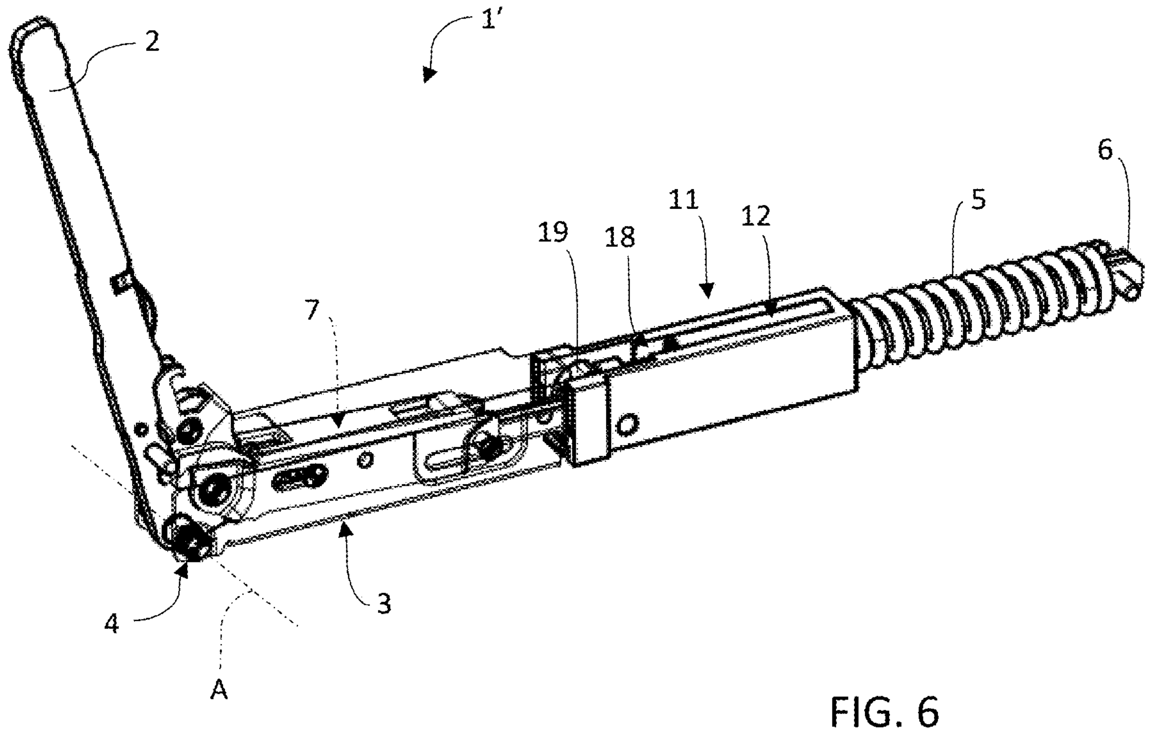
Figure 6:
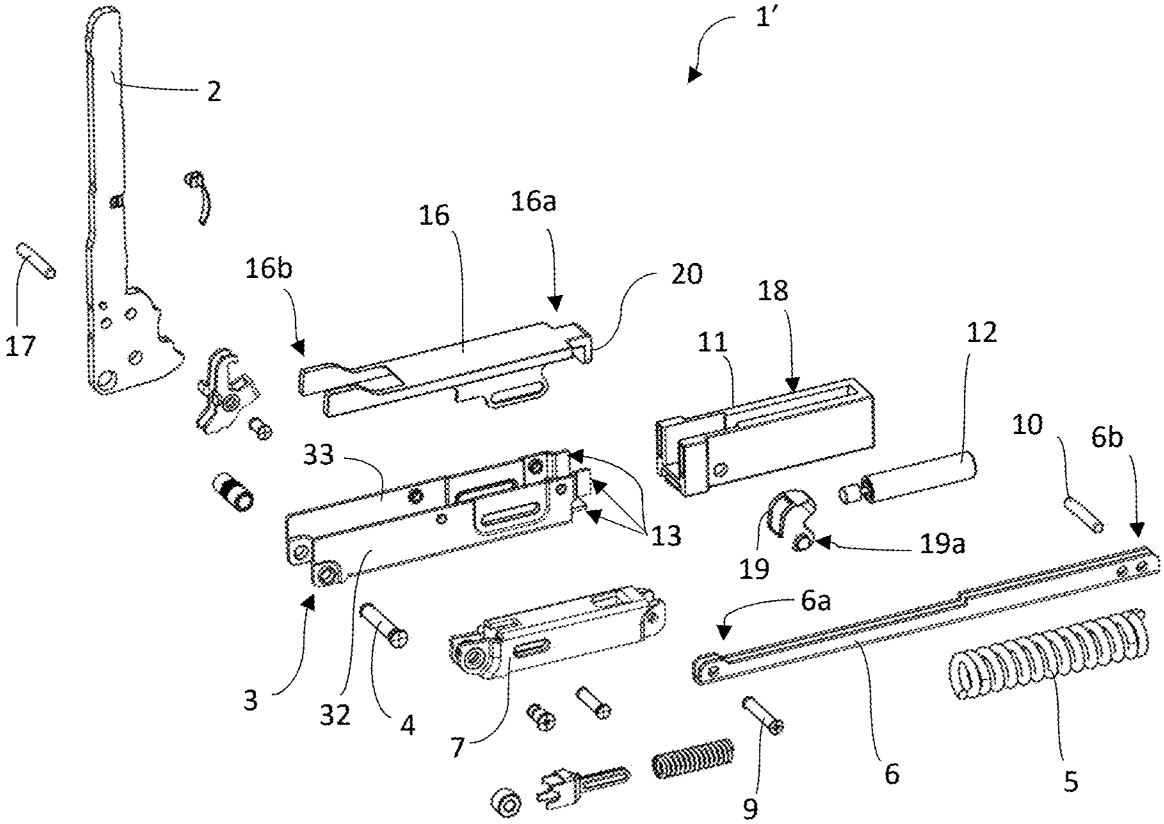

FIG. 3*a* is a partly exploded schematic view of a part of the hinge of the preceding drawings;

FIG. 4 is a schematic perspective view from above of a detail of the hinge of FIGS. 1 to 3;

FIG. 5 is a schematic perspective view, in a partly open position and with some parts transparent to better illustrate others, of a second embodiment of the hinge according to this invention;

FIG. 6 is a schematic exploded configuration view of the hinge of FIG. 5;

FIG. 7 is a schematic perspective view from above of a detail of the hinge of FIGS. 5 and 6;

With reference to FIGS. 1 and 2, the reference numeral 1 denotes a first embodiment of the hinge for electrical household appliances made according to this invention.

The hinge 1 comprises a first lever 2, which can be fixed for example to the frame of an oven, not illustrated, at a respective side of the access opening of the latter, and a box-shaped element 3 which can be fixed to a respective edge of a door, also not illustrated, for closing the oven.

The box-shaped element 3 has an elongate shape and extends longitudinally along a main predetermined direction of extension D.

As clearly shown in FIG. 4, the box-shaped element 3 has a bottom wall 31 and two side walls 32, 33, extending parallel to each other from the bottom wall 31.

The first lever 2 and the box-shaped element 3 are kinematically connected to each other, with the first lever 2 pivoted on the box-shaped element 3 by means of a first pin 4, to make the above-mentioned and not illustrated door tiltably movable relative to the frame, between a closed position and an open position.

The first pin 4 has a central axis A which defines an axis of rotation of the hinge 1.

As illustrated in the accompanying drawings, the hinge 1 comprises a first helical spring 5 housed outside the box-shaped element 3.

The first helical spring 5 defines, for the hinge 1, a first elastic element.

The first helical spring 5 is designed to generate, with a relative deformation, an elastic reaction force to compensate at least partially the weight force of the door during the opening or closing of the door.

The first helical spring 5 is therefore operatively connected to the above-mentioned first lever 2 by a control rod 6 and a tie rod 7.

The control rod 6 is also defined as a spring-guide rod.

By means of a connecting pin 8, the tie rod 7 is connected, with a relative first proximal end 7*a*, to the first lever 2 and, with a relative second distal end 7*b*, to a first proximal end 6*a* of the control rod 6, by means of a second connecting pin 9.

The second connecting pin 9 is slidably engaged inside two respective guide slots 34 made, respectively, in the two side walls 32, 33 of the box-shaped element 3.

The control rod 6 therefore has a respective second distal end 6*b*, at which means 10 are positioned for engaging with a distal end coil 5*a* of the helical spring 5.

Advantageously, the above-mentioned engagement means 10 comprise a pin inserted in a corresponding hole made in the control rod 6.

The presence of several holes advantageously allows different pre-compressions of the helical spring 5 to be operated.

As illustrated in FIGS. 1, 2, the hinge 1 comprises a cartridge 11 for containing a damping member 12.

The damping member 12 is advantageously a damping member of the hydraulic or pneumatic type.

The damping member 12 is designed for applying a damping action during the reciprocal motion of the first lever 2 and of the box-shaped element 3, at least in the proximity of reaching the above-mentioned closed position.

The containment cartridge 11 is positioned externally in a cantilever fashion relative to the box-shaped element 3 and interposed between the box-shaped element 3 and the first helical spring 5.

The containment cartridge 11 is connected to the box-shaped element 3 in a removable fashion.

As illustrated in FIGS. 3, 3*a* and 4, at a distal end 3*a* of the box-shaped element 3 there are, on the respective bottom wall 31 and side walls 32, 33, three tabs 13 emerging from the box-shaped element 3 along the above-mentioned direction D.

Again with reference to FIGS. 3 and 4, cavities 14 shaped to match the above-mentioned tabs and designed to receive inside them the tabs 13 are made on the cartridge 11.

The above-mentioned tabs 13 and cavities 14 define, in their entirety for the hinge 1, snap fitting means 15 configured for stably engaging the cartridge 11 with the box-shaped element 3 at a distal end portion 3*a* of the latter.

As illustrated in FIG. 4, the containment cartridge 11 has a through slot 11*a* inside of which the above-mentioned control rod 6 is slidably engaged.

In other words, by means of the through slot 11*a* the control rod 6 is able to pass from one end to the other through the cartridge 11 to reach the helical spring 5 positioned outside the cartridge 11.

As illustrated in FIGS. 1, 2 and 3, the hinge 1 comprises a slide 16 for controlling the damping member 12, extending longitudinally along the above-mentioned direction D and slidably engaged on the box-shaped element 3, above it.

The slide 16 is designed to engage with the first lever 2 and with the damping member 12 for sliding longitudinally and controlling the latter axially along the direction D.

The slide 16 has, at a relative first distal end 16*a* facing the cartridge 11, a tooth 20, shown in FIG. 3*a*, configured to apply a thrust against the above-mentioned damping member 12.

The above-mentioned tooth 20 protrudes from the slide 16 transversely to the above-mentioned predetermined direction D, facing towards the bottom wall 31 of the box-shaped element 3.

The slide 16, at its second proximal end 16*b*, has a fork shape configured to generate the contact with a thrust element 17 emerging on both sides from the first lever 2.

As illustrated in FIG. 4, the containment cartridge 11 has a slot 18 configured to allow the feeding along the predetermined direction D of the above-mentioned tooth 20 during operation of the damping member 12.

FIGS. 5 to 7 illustrate, denoted by the reference numeral 1', a variant embodiment of the hinge 1 just described above with reference to FIGS. 1 to 4.

The hinge 1' basically reproduces all the technical features of the hinge 1 described above and to which reference should therefore be made for the indication of the common components which in FIGS. 5 to 7 have the same reference numerals used for the hinge 1 illustrated in FIGS. 1 to 4, except for the fact that in the hinge 1' the damping member 12 is actuated by a cam-shaped lever 19 instead of directly by the slide 16.

The cartridge 11 for containing the hinge 1' is therefore shaped differently from that of the hinge 1, since it must also house inside it the above-mentioned cam-shaped lever 19.

The cam-shaped lever 19 has the purpose of modulating the actuation of the damping member 12 according to a predetermined law and defined, precisely, by the shape of the cam profile.

The cam lever 19 is pivoted on the containment cartridge 11 by means of pins 19*a* made on both sides on the lever 19 and inserted in suitable holes made on side walls of the cartridge 11.

Another difference between the hinge 1 and the hinge 1' lies in the shape of the slider 16 which, in the embodiment 1' shown in FIGS. 5 to 7, has a relative tooth 20 protruding at the distal end 16*a* of the slider 16.

As illustrated in the accompanying drawings, the length of the respective control rod 6 of the two hinges 1 and 1' differs in respect of the different extension of the respective cartridge 11 in the direction D.

According to alternative embodiments not illustrated, the control lever 6 used may be the same for cartridges 11 of different extension, with different holes provided at the distal end 6*b* of the rod 6 so as to modify the position of the means 10 for engaging the helical spring 5 as a function of the actual dimensions of the cartridge 11 used.

With reference to what is described above, the above-mentioned slide 16, cam-shaped lever 19 and thrust elements 17 define in their entirety, for the hinge 1, 1', respective means of actuating the damping member 12.

In use, the hinge 1, 1' according to this invention allows the assembly of the cartridge 11 and the relative damping member 12 outside the box-shaped element 3, by slotting the cartridge 11 into the distal end 3*a* of the box-shaped element.

In other words, the assembly of the hinge 1, 1' according to the invention is of the modular type considering the cartridge 11 as a module which is joined to the remaining parts of the hinge and may be selected between possible different variants depending on the specific requirements required.

In effect, as described above and as illustrated in the accompanying drawings, cartridges 11 which are also different to each other are combined and fixed to a same box-shaped element 3.

The hinge 1, 1' for doors of electrical household appliances according to the invention achieves the preset aims and brings important advantages.

A first advantage is due to the fact that by means of the hinge 1 according to the invention, the problem linked with the insertion of the damping member inside the box-shaped element is overcome since the damping member is located outside it.

Another advantage connected to the hinge according to the invention is due to the fact that since the damping member is located in a cartridge outside the box-shaped element with a coupling of a modular type, the modification of the technical features and dimensions of the damping member is completely practical and does not result in modifications to the box-shaped element, which may therefore remain unchanged also for hinges with different functional features and does not require a new design.

The invention claimed is:

1. A hinge for doors of electrical household appliances, comprising:

a box-shaped element having a main direction of extension, a pivot pin a first lever pivoted on said box-shaped element by the pivot pin one of either the box-shaped element or the first lever being fixable to a frame of an electrical household appliance and the other of either the box-shaped element or the first lever being fixable to a door to make the door tiltably movable relative to the frame between a closed position and an open position, a first elastic element positioned outside said box-shaped element, operatively connected to said first lever and configured to generate with a relative deformation an elastic reaction force for compensating at least partially a weight force of the door during the opening or closing of the door, a damping member for applying a damping action during the-reciprocal motion of said first lever and said box-shaped element, at least in a proximity of the closed position, a containment cartridge for containing said damping member, wherein said containment cartridge is positioned externally projecting from said box-shaped element and interposed between said box-shaped element and said first elastic element; and a snap fitting device configured to stably engage said containment cartridge with an end portion of said box-shaped element.

2. The hinge according to claim 1, wherein said snap fitting device comprises a plurality of tabs emerging from said box-shaped element and a corresponding plurality of cavities formed in said containment cartridge and shaped to match said tabs.

3. The hinge according to claim 1, and further comprising a control rod for controlling said first elastic element, said control rod moving parallel to said main direction of extension of said box-shaped element, wherein said containment cartridge comprises a through slot, said control rod engaging slidably inside said through slot.

4. The hinge according to claim 1, wherein said first elastic element is a compression element, wherein said containment cartridge defines, with a relative distal end face, an abutment for said first elastic element.

5. The hinge according to claim 1, and further comprising an actuator for actuating said damping member, wherein said actuator comprisest prise a slide slidably engaged on said box-shaped element, said slide having a tooth configured to exert a thrust against said damping member.

6. The hinge according to claim 5, wherein said containment cartridge has a slot configured to allow feeding of said tooth during actuation of said damping member.

7. The hinge according to claim 5, wherein said actuator comprises a cam-shaped lever supported by said containment cartridge and acting on the damping member.

8. The hinge according to claim 5, wherein said cam-shaped lever is interposed between said tooth and said damping member.

9. The hinge according to claim 5, wherein said actuator comprises a thrust element positioned on said first lever and configured to engage by pushing against said slide.

10. The hinge according to claim 2, and further comprising a control rod for controlling said first elastic element, said control rod moving parallel to said main direction of extension of said box-shaped element, wherein said containment cartridge comprises a through slot, said control rod engaging slidably inside said through slot.

11. The hinge according to claim 10, wherein said first elastic element is a compression element, wherein said containment cartridge defines, with a relative distal end face, an abutment for said first elastic element.

12. The hinge according to claim 3, wherein said first elastic element is a compression element, wherein said containment cartridge defines, with a relative distal end face, an abutment for said first elastic element.

13. A hinge for doors of electrical household appliances, comprising:

a box-shaped element having a main direction of extension, a pivot pin, a first lever pivoted on said box-shaped element by the pivot pin, one of either the box-shaped element or the first lever being fixable to a frame of an electrical household appliance and the other of either the box-shaped element or the first lever being fixable to a door to make the door tiltably movable relative to the frame between a closed position and an open position, a first elastic element positioned outside said box-shaped element, operatively connected to said first lever and configured to generate with a relative deformation an elastic reaction force for compensating at least partially a weight force of the door during the opening or closing of the door, a damping member for applying a damping action during reciprocal motion of said first lever and said box-shaped element, at least in a proximity of the closed position, a containment cartridge for containing said damping member, wherein said containment cartridge is positioned externally projecting from said box-shaped element and interposed between said box-shaped element and said first elastic element; and a control rod for controlling said first elastic element, said control rod moving parallel to said main direction of extension of said box-shaped element, wherein said containment cartridge comprises a through slot, said control rod engaging slidably inside said through slot.

14. A hinge for doors of electrical household appliances, comprising:

a box-shaped element having a main direction of extension, a pivot pin, a first lever pivoted on said box-shaped element by the pivot pin, one of either the box-shaped element or the first lever being fixable to a frame of an electrical household appliance and the other of either the box-shaped element or the first lever being fixable to a door to make the door tiltably movable relative to the frame between a closed position and an open position, a first elastic element positioned outside said box-shaped element, operatively connected to said first lever and configured to generate with a relative deformation an elastic reaction force for compensating at least partially a weight force of the door during the opening or closing of the door, a damping member for applying a damping action during reciprocal motion of said first lever and said box-shaped element, at least in a proximity of the closed position, a containment cartridge for containing said damping member, wherein said containment cartridge is positioned externally projecting from said box-shaped element and interposed between said box-shaped element and said first elastic element; and wherein said first elastic element is a compression element, wherein said containment cartridge defines, with a relative distal end face, an abutment for said first elastic element.

* * * * *